United States Patent
Takei et al.

(10) Patent No.: US 10,022,902 B2
(45) Date of Patent: Jul. 17, 2018

(54) INJECTION APPARATUS MOLDING APPARATUS, AND MOLDING METHOD

(71) Applicant: Toshiba Kikai Kabushiki Kaisha, Chiyoda-ku, Tokyo (JP)

(72) Inventors: Kazuyasu Takei, Yamato (JP); Ryusuke Nakata, Zama (JP); Hiroshi Yokoyama, Ebina (JP)

(73) Assignee: TOSHIBA KIKAI KABUSHIKI KAISHA, Chiyoda-ku, Tokyo (JP)

( * ) Notice: Subject to any disclaimer, the term of this patent is extended or adjusted under 35 U.S.C. 154(b) by 239 days.

(21) Appl. No.: 14/991,679

(22) Filed: Jan. 8, 2016

(65) Prior Publication Data

US 2016/0200022 A1   Jul. 14, 2016

(30) Foreign Application Priority Data

Jan. 9, 2015   (JP) ................. 2015-002899

(51) Int. Cl.
B22D 17/32     (2006.01)
B29C 45/82     (2006.01)
(Continued)

(52) U.S. Cl.
CPC ............ *B29C 45/82* (2013.01); *B29C 45/531* (2013.01); *B29C 45/77* (2013.01); *B22D 17/203* (2013.01);
(Continued)

(58) Field of Classification Search
CPC .............................. B22D 17/32; B29D 17/203
See application file for complete search history.

(56) References Cited

U.S. PATENT DOCUMENTS 4,407,649 A    10/1983  Saito
5,870,305 A *   2/1999  Yokoyama ............. B22D 17/32
                                              700/146
(Continued)

FOREIGN PATENT DOCUMENTS

JP    S57-128526    8/1982
JP    2000-141017   5/2000
(Continued)

OTHER PUBLICATIONS

English Language Abstract and English Language Translation of JP 2014-065062 published Apr. 17, 2014.
(Continued)

*Primary Examiner* — Jill L Heitbrink
(74) *Attorney, Agent, or Firm* — DLA Piper LLP US

(57) ABSTRACT

A control device of an injection apparatus outputs a control command to a hydraulic pressure device to perform injection by supplying hydraulic fluid to the back of an injection piston 15 from an accumulator 25 and, at this time, to execute speed control for controlling the speed of the plunger by an opening degree of an injection control valve. Further, the control device outputs a control command to the hydraulic pressure device to perform boosting by opening a booster valve to supply hydraulic fluid to the back of the booster piston and pressurizing the hydraulic fluid behind the injection piston by the booster piston and, at this time, to execute pressure control for controlling the pressure of the molding material by an opening degree of the injection control valve. Further, the control device can start outputting a control command for pressure control after start of outputting a control command for opening the booster valve in transition from injection to boosting.

6 Claims, 7 Drawing Sheets

(51) Int. Cl.
  B29C 45/53 (2006.01)
  B29C 45/77 (2006.01)
  B22D 17/20 (2006.01)
  B29C 45/00 (2006.01)

(52) U.S. Cl.
  CPC .......... *B22D 17/32* (2013.01); *B29C 45/0025* (2013.01); *B29C 2045/0036* (2013.01); *B29C 2945/76498* (2013.01); *B29C 2945/76678* (2013.01); *B29C 2945/76859* (2013.01)

(56) References Cited

U.S. PATENT DOCUMENTS

| | | | |
|---|---|---|---|
| 6,241,003 | B1 | 6/2001 | Kodama et al. |
| 2001/0013403 | A1 | 8/2001 | Kodama et al. |
| 2004/0033141 | A1 | 2/2004 | Stillhard et al. |

FOREIGN PATENT DOCUMENTS

| | | |
|---|---|---|
| JP | 2004-066253 | 3/2004 |
| JP | 2013-018011 | 1/2013 |
| JP | 2013-128953 | 7/2013 |
| JP | 2014-065062 | 4/2014 |

OTHER PUBLICATIONS

Chinease Office Action (with English Translation) issued in CN Application No. 201511009692.7 dated Jul. 13, 2017.
Japanese Office Action (with English Translation) issued in JP Application No. 2015-002899 dated Jan. 24, 2017.
English Language Abstract and Translation of JP 2000-141017 issued May 23, 2000.
English Language Abstract and Translation of JP 2004-066253 published Mar. 4, 2004.
English Language Abstract and Translation of JP 2013-018011 published Jan. 13, 2013.
English Language Abstract and Translation of JP 2013-128953 published Jul. 4, 2013.
English Language Abstract and Translation of JP 2014-065062 published Apr. 17, 2014.
English Language Abstract of JP S57-128526 published Aug. 10, 1982.

* cited by examiner

INJECTION APPARATUS MOLDING APPARATUS, AND MOLDING METHOD

TECHNICAL FIELD

The present invention relates to an injection apparatus, a molding apparatus (molding machine), and a molding method injecting a molding material into a mold. The molding apparatus is for example a die cast machine or an injection molding machine.

BACKGROUND ART

Known in the art is an injection apparatus in which a plunger for injecting a molding material in a sleeve into a mold is driven by a booster type injection cylinder (for example Patent Literature 1).

Such a booster type injection cylinder has an injection piston which is connected to the plunger and has a booster piston capable of pressurizing a hydraulic fluid (for example oil) behind the injection piston. Further, by supply of the hydraulic fluid from an accumulator or other hydraulic pressure source to the back of the injection piston, the plunger moves forward and the molding material in the sleeve is injected into the mold. That is, an injection process is carried out. Further, after the injection process, by supply of hydraulic fluid to the back of the booster piston, the hydraulic fluid behind the injection piston is pressurized by the booster piston, and consequently the molding material in the mold is pressurized by the plunger. That is, a boosting process is carried out.

The injection apparatus in Patent Literature 1 has a control valve for controlling the flow rate of the hydraulic fluid discharged from the front of the injection piston (valve configuring a meter-out circuit) for controlling the speed of the plunger. Further, to ensure the timing of start of boosting becomes a suitable one, the injection apparatus in Patent Literature 1 determines the timing of start of boosting based on the time when the speed of the plunger which has decelerated by receiving a counterforce from the molding material filled in the mold falls to a predetermined threshold value. When the timing of start of boosting arrives, the control device of the injection apparatus in Patent Literature 1 outputs a signal for opening the booster valve which controls the supply of the hydraulic fluid to the back of the booster piston and outputs a signal for changing the opening degree of the control valve to one for boosting simultaneously with this.

CITATION LIST

Patent Literature

Patent Literature 1. Japanese Patent Publication No. 2014-65062A

SUMMARY OF INVENTION

Technical Problem

However, in the art of Patent Literature 1, a suitable boosting characteristic is liable to not be obtained. Specifically, for example, if the threshold value of the speed of the plunger is set relatively high so that there is no delay in the start of boosting from when the plunger stops (completion of filling of the molding material), a servo valve is opened while the molding material is still not fully filled in the mold. As a result, for example, the speed of the plunger is liable to temporarily become high, so burrs will be formed. On the other hand, if the threshold value is set low to delay the start of boosting so as not to form such burrs, after the plunger stops, there will be a period during which the pressure of the molding material does not rise that much (delay time). As a result, for example, sinks or mold cavities are liable to be formed. Reduction of both burrs and the delay time was difficult by the art of Patent Literature 1.

Accordingly, it is desired to provide an injection apparatus, molding apparatus, and molding method capable of improving the boosting characteristic.

Solution to Problem

An injection apparatus according to one aspect of the present invention has a plunger injecting a molding material into a mold; an injection cylinder having an injection piston connected to the plunger and a booster piston capable of pressurizing a hydraulic fluid in back of the injection piston; a hydraulic pressure device having a hydraulic pressure source capable of supplying the hydraulic fluid to the back of the injection piston, an injection control valve capable of controlling the discharge of the hydraulic fluid from the front of the injection piston, and a booster valve for controlling the supply of the hydraulic fluid to the back of the booster piston; and a control device for controlling the hydraulic pressure device. The control device outputs control commands to the hydraulic pressure device so as to supply hydraulic fluid from the hydraulic pressure source to the back of the injection piston to thereby perform injection and, at that time, execute speed control for controlling the speed of the plunger by an opening degree of the injection control valve; and to open the booster valve to supply hydraulic fluid to the back of the booster piston and use the booster piston to pressurize the hydraulic fluid behind the injection piston to thereby perform boosting and, at this time, execute pressure control for controlling the pressure of the molding material according to the opening degree of the injection control valve. The control device can start output of a control command for the pressure control after output of a control command for opening the booster valve in transition from injection to boosting.

Preferably, the control device starts output of the control command for opening the booster valve when the position of the plunger reaches a predetermined boosting start position. After that, the control device starts output of the control command for the pressure control when a physical quantity which can fluctuate among a plurality of cycles in accordance with variation of the amount of supply of the molding material among a plurality of cycles even if the position of the plunger is the same position among a plurality of cycles reaches a predetermined switching judgment value.

Preferably, the control device starts output of the control command for the pressure control when the speed of the plunger as the physical quantity falls to the switching judgment value.

Preferably, the injection apparatus further has a display device. The control device makes the display device display a predetermined alarm display in case where the position of the plunger at the time when the plunger stops due to completion of filling the molding material into the mold exceeds a predetermined threshold value.

A molding apparatus according to an aspect of the present invention is provided with the injection apparatus described above.

A molding method according to an aspect of the present invention is a molding method using an injection apparatus having an injection cylinder which has an injection piston connected to a plunger for injecting a molding material into a mold and a booster piston capable of pressurizing the pressure in the back of the injection piston, and a hydraulic pressure device which has an injection control valve capable of controlling a discharge of the hydraulic fluid from the front of the injection piston and has a booster valve for controlling the supply of the hydraulic fluid to the back of the booster piston. The molding method has a hydraulic fluid supplying step of supplying hydraulic fluid to the back of the injection piston, a speed control command step of commanding the hydraulic pressure device to perform speed control for controlling the speed of the plunger by an opening degree of the injection control valve at the time of injection, a booster valve opening command step of commanding the hydraulic pressure device to open the booster valve, and a pressure control command step of commanding the hydraulic pressure device to perform pressure control for controlling the pressure of the molding material by the opening degree of the injection control valve at the time of boosting. The pressure control command step is started after the start of the booster valve opening command step.

Advantageous Effects of Invention

According to the present invention, the boosting characteristic can be improved.

DESCRIPTION OF EMBODIMENTS

First Embodiment (Configuration of Injection Apparatus)

Figure 1:
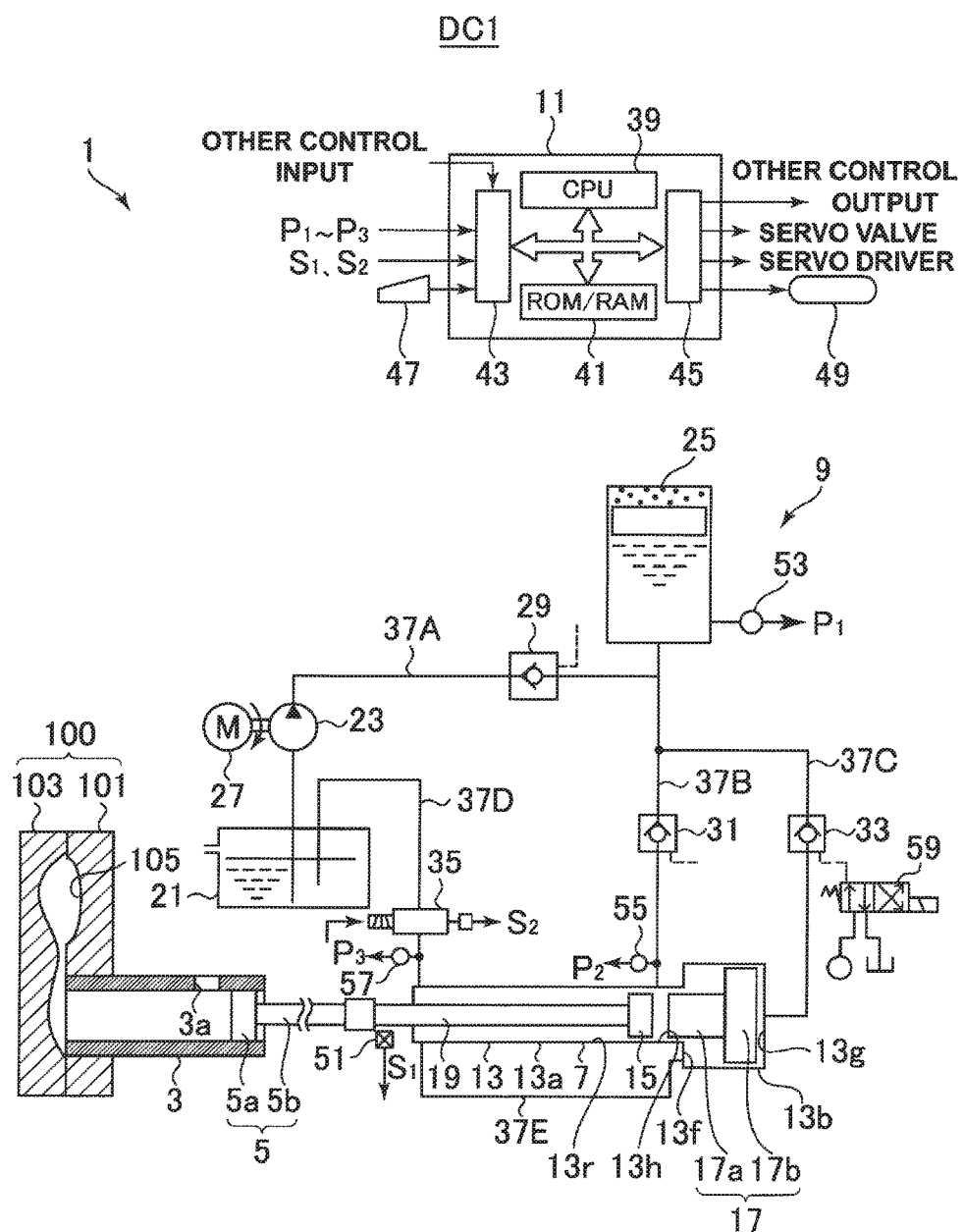
FIG. 1 A schematic view showing the configuration of a principal part of an injection apparatus of a die cast machine according to a first embodiment of the present invention.

FIG. 1 is a view showing the configuration of a principal part of an injection apparatus 1 of a die cast machine DC1 according to a first embodiment of the present invention.

The die cast machine DC1 is one injecting a molten metal (metal material in a molten state) into a mold (die) 100 (cavity 105) and making that molten metal solidify in the mold 100 to thereby produce a die casting (molded article). The mold 100 includes for example a fixed mold (fixed die) 101 and a moving mold (moving die) 103.

Specifically, the die cast machine DC1 has for example a not shown mold clamping device for executing the die opening and closing and the mold clamping of the mold 100, an injection apparatus 1 for injecting a molten metal to an internal portion of the clamped mold 100, a not shown ejection device for ejecting the die casting from the fixed mold 101 or moving mold 103, and a control device for controlling them. The configurations other than the injection apparatus 1 may be basically the same as the conventional configurations, so explanations will be omitted.

The injection apparatus 1, for example, has a sleeve 3 communicated with a cavity 105, a plunger 5 for injecting the molten metal in the sleeve 3 into the cavity 105, an injection cylinder 7 which drives the plunger 5, a hydraulic pressure device 9 which executes supplying a hydraulic fluid (for example oil) to the injection cylinder 7, and so on and a control device 11 for controlling the hydraulic pressure device 9.

The sleeve 3 is for example a cylindrical member which is inserted in the fixed mold 101. The plunger 5 has a plunger tip 5a which can slide in the front-and-back direction in the sleeve 5 and has a plunger rod 5b fixed to the plunger tip 5a. Note that, a case where two members are fixed includes not only a case where two members are separately formed and then fixed to each other, but also a case where the two members are integrally formed so as to be fixed to each other.

By sliding (forward movement) of the plunger tip 5a in the sleeve 3 toward the cavity 105 in a state where the molten metal is supplied into the sleeve 3 from a hot metal supply opening 3a formed in the upper surface of the sleeve 3, the molten metal is injected into the cavity 105.

The injection cylinder 7 is for example configured by a so-called direct coupled booster type cylinder. Specifically, for example, the injection cylinder 7 has a cylinder portion 13, an injection piston 15 and a booster piston 17 capable of sliding inside the cylinder portion 13, and a piston rod 19 which is fixed to the injection piston 15 and extends outwardly from the cylinder portion 13.

The cylinder portion 13 for example has an injection cylinder portion 13a and a booster cylinder portion 13b which is connected to the rear end (the side opposite to the side of outward extension of the piston rod 19) of the injection cylinder portion 13a. The injection cylinder portion 13a and booster cylinder portion 13b are for example cylindrical bodies with circular cross-sectional shapes of internal portions. The booster cylinder portion 13b is formed with a larger diameter than the injection cylinder portion 13a.

The injection piston 15 is arranged in the injection cylinder portion 13a. The internal portion of the injection cylinder portion 13a is partitioned by the injection piston 15 into a rod side chamber 13r at the side where the piston rod 19 extends outwardly and a head side chamber 13h at the opposite side. By selective supply of the hydraulic fluid to the rod side chamber 13r and head side chamber 13h, the injection piston 15 slides in the front-and-back direction inside the cylinder portion 13.

The booster piston 17 has a small diameter portion 17a capable of sliding inside the rear end part of the injection cylinder portion 13a (head side chamber 13h) and a large diameter portion 17b capable of sliding inside the booster cylinder portion 13b. The internal portion of the booster cylinder portion 13b is partitioned by the large diameter portion 17b into a front side chamber 13f at the injection cylinder portion 13a side and a rear side chamber 13g at the opposite side.

Accordingly, when depressurizing the front side chamber 13f, due to the difference between the working area of the small diameter portion 17a in the head side chamber 13h and the working area of the large diameter portion 17b in the rear side chamber 13g, the booster piston 17 can apply a pressure higher than the pressure received from the hydraulic fluid from the rear side chamber 13g to the hydraulic fluid in the head side chamber 13h. Due to this, the injection cylinder 7 has a boosting function.

The injection cylinder 7 is coaxially arranged with respective to the plunger 5. Further, the piston rod 19 is connected through a coupling to the plunger 5. The cylinder portion 13 is provided in a fixed manner with respect to a not shown clamping apparatus etc. Accordingly, by movement of the injection piston 15 with respect to the cylinder portion 13, the plunger 5 moves forward or retracts in the sleeve 3.

The hydraulic pressure device 9 for example has a tank 21 storing a hydraulic fluid, a pump 23 capable of delivering the hydraulic fluid in the tank 21, an accumulator 25 capable of releasing the accumulated hydraulic fluid, a plurality of flow paths 37A to 37E connecting these and the injection cylinder 7 to each other, and a plurality of valves (29, 31, 33, and 35) for controlling the flow of the hydraulic fluid in the plurality of flow paths.

The tank 21 is for example an open tank and holds the hydraulic fluid under atmospheric pressure. The tank 21 supplies the hydraulic fluid through the pump 23 and accumulator 25 to the injection cylinder 7 and stores the hydraulic fluid discharged from the injection cylinder 7.

The pump 23 may be a gear pump or vane pump or other rotary pump which ejects hydraulic fluid by rotation of a rotor or may be an axial type plunger pump or radial type plunger pump or other plunger pump which ejects hydraulic fluid by reciprocation of a piston. Further, the pump 23 may be a constant capacity pump in which the discharge quantity in one cycle of operation of the rotor or piston is fixed or may be a variable capacity pump in which the discharge quantity is made variable. It is sufficient so far as the pump 23 can eject hydraulic fluid in one direction. However, it may have the same structure as that of a bi-directional (two-direction) pump as well.

The pump 23 is for example driven by a rotary electric motor 27. The electric motor 27 may be a DC motor or AC motor. Further, the electric motor 27 may be configured by an induction motor or synchronous motor or another suitable motor. The electric motor 27 may be a servo motor which configures a servo mechanism together with a not shown encoder and servo driver or may be one controlled in an open loop.

The pump 23 contributes to the supply of hydraulic fluid to the accumulator 25 (accumulation of the accumulator 25) and the supply of hydraulic fluid to the injection cylinder 7. Note that, during the operation of the die cast machine DC1, the pump 23 (electric motor 27) may be driven all the time or may be driven according to need.

The accumulator 25 may be configured by an accumulator of a weight type, spring type, gas pressure type (including air pressure type), cylinder type, bladder type, or another suitable form. For example, the accumulator 25 is an accumulator of gas pressure type, cylinder type, or bladder type in which pressure is accumulated by compression of gas (for example air or nitrogen) held in the accumulator 25 and which supplies hydraulic fluid by this accumulated pressure.

The flow path 37A connects the pump 23 and the accumulator 25. Due to this, for example, pressure can be accumulated in the accumulator 25 by suppling hydraulic fluid from the pump 23 to the accumulator 25.

The flow path 37B connects the accumulator 25 and the head side chamber 13h. Due to this, for example, the injection piston 15 can be moved forward by supplying hydraulic fluid from the accumulator 25 to the head side chamber 13h.

The flow path 37C connects the accumulator 25 and the rear side chamber 13g. Due to this, for example, the hydraulic fluid can be supplied from the accumulator 25 to the rear side chamber 13g, and the hydraulic fluid in the head side chamber 13h can be pressurized by the booster piston 17.

The flow path 37D connects the rod side chamber 13r and the tank 21. Due to this, for example, the hydraulic fluid discharged from the rod side chamber 13r along with the forward movement of the injection piston 15 can be stored in the tank 21.

The flow path 37E connects the rod side chamber 13r and the front side chamber 13f. Due to this, for example, the front side chamber 13f is connected through the rod side chamber 13r to the tank 21, and the hydraulic fluid in the front side chamber 13f can be discharged.

Note that, in FIG. 1, as representative flow paths provided in the hydraulic pressure device 9, the flow paths 37A to 37E are illustrated. In actuality, as will be suitably referred to later, the hydraulic pressure device 9 has other flow paths which are not shown.

The shown or not shown plurality of flow paths are for example configured by steel pipes, flexible hoses, or metal blocks. A portion of the plurality of flow paths may be suitably shared. For example, in the example in FIG. 1, among the flow paths 37A to 37C, the portion on the accumulator 25 side is made common.

An accumulator valve 29 is provided at the flow path 37A. For example, it contributes to prevention of backflow of the hydraulic fluid from the accumulator 25 to the pump 23. The configuration of the accumulator valve 29 may be a suitable one as well. In FIG. 1, however, one configured by a pilot type check valve is exemplified. The check valve, for example, permits the flow of the hydraulic fluid from the pump 23 to the accumulator 25 and prohibits the flow in an opposite direction when a pilot pressure is not introduced while prohibits the flow of the two (closed) when a pilot pressure is introduced.

An injection valve 31 is provided at the flow path 37B. For example, it contributes to permission and prohibition of release of the hydraulic fluid from the accumulator 25 to the head side chamber 13h. The configuration of the injection valve 31 may be a suitable one as well. In FIG. 1, however, one configured by a pilot type check valve is exemplified. The check valve, for example, permits the flow of the hydraulic fluid from the accumulator 25 to the head side chamber 13h and prohibits the flow in the opposite direction when a pilot pressure is not introduced while prohibits the flow of the two (closed) when a pilot pressure is introduced.

A booster valve 33 is provided at the flow path 37C and for example contributes to permission and prohibition of release of the hydraulic fluid from the accumulator 25 to the rear side chamber 13g. The configuration of the booster valve 33 may be a suitable one as well. In FIG. 1, however, one configured by a pilot type check valve is exemplified. The check valve, for example, permits the flow of the hydraulic fluid from the accumulator 25 to the rear side chamber 13g and prohibits the flow in the opposite direction when a pilot pressure is not introduced while prohibits the flow of the two (closed) when a pilot pressure is introduced.

The servo valve 35 is provided at the flow path 37D. For example, it controls the flow rate of the hydraulic fluid which is discharged from the rod side chamber 13r to the tank 21. The servo valve 35, for example, can continuously adjust the flow rate by opening by an opening degree in accordance with an input voltage. Further, the servo valve 35 can output a signal $S_2$ in accordance with the opening degree. Based on that signal $S_2$, feedback control of the servo valve 35 is carried out, whereby a servo mechanism is configured. The servo valve 35 is for example configured by a flow control valve with pressure compensation. The servo valve 35 can control the operation of the injection cylinder 7 (speed of the injection piston 15 etc.) by control of the flow rate of the hydraulic fluid which is discharged from the rod side chamber 13r and configures a so-called "meter-out circuit". The servo valve 35 may be a driver mounted type or may be a not mounted type. In the following description, reference to the driver is basically omitted in relation to the input of the signal to the servo valve 35.

The hydraulic pressure circuit for controlling the pilot pressures for various types of valves (29, 31, 33, etc.) may be suitably configured. In FIG. 1, as one portion of such hydraulic pressure circuit, a solenoid valve 59 which controls introduction of the pilot pressure for the booster valve 33 is exemplified. The solenoid valve 59 for example permits or prohibits the flow of the hydraulic fluid from a suitable hydraulic pressure source (may be pump 23 or accumulator 25 as well) which supplies a pilot pressure to the booster valve 33.

The control device 11 includes for example a CPU 39, memory 41 such as ROM or RAM, input circuit 43, and output circuit 45. The CPU 39 executes a program stored in the memory 41 and outputs control signals (control commands) for controlling the portions through the output circuit 45 based on input signals which are input through the input circuit 43. Note that, the control device 11 may be configured as a control device of the injection apparatus 1 or may be configured as a control device of the die cast machine DC1 which controls not only the operation of the injection apparatus 1, but also operations of the not shown clamping device and not shown ejection device.

The members which input signals to the input circuit 43 are for example the input device 47 receiving input operations of a user, a position sensor 51 which detects the position of the piston rod 19, an accumulator pressure sensor 53 for detecting the pressure of the accumulator 25, a head side pressure sensor 55 for detecting the pressure of the head side chamber 13h, a rod side pressure sensor 57 for detecting the pressure of the rod side chamber 13r, the already explained servo valve 35, and an encoder (not shown) of the electric motor 27 in the case where the electric motor 27 is a servo motor.

The members to which the output circuit 45 outputs signals are for example the display device 49 which displays information to the user, a not shown driver for driving the electric motor 27, the servo valve 35, and a hydraulic pressure circuit which controls introduction of pilot pressures to the various types of valves (29, 31, 33, etc.)

The input device 47 and display device 49 may be given suitable configurations. Part or all of them may be integrally configured. For example, the input device 47 and display device 49 may be configured by including a touch panel type liquid crystal display device and mechanical switch.

The position sensor 51 for example detects the position of the piston rod 19 relative to the cylinder portion 13 and indirectly detects the position of the plunger 5. The configuration of the position sensor 51 may be a suitable one. For example, the position sensor 51 may be configure a magnetic or optical linear encoder together with a not shown scale portion which is provided at the piston rod 19 in a fixed manner and extends in the axial direction of the piston rod 19 or may be configured by a laser length measuring machine for measuring the distance from the member fixed to the piston rod 19. The position sensor 51 or control device 11 can acquire (detect) the speed of the plunger 5 by differentiating the position of the plunger 5 which is detected.

The head side pressure sensor 55 and rod side pressure sensor 57 indirectly detect the pressure which is applied to the molten metal by the plunger 5 such as the pressure (injection pressure) which is applied by the plunger 5 to the molten metal when injecting the molten metal to the cavity 105. For example, the control device 11 can calculate the pressure given to the molten metal by the plunger 5 based on the detection value of the head side pressure sensor 55, the detection value of the rod side pressure sensor 57, a pressurized area in the head side chamber 13h of the injection piston 15, a pressurized area in the rod side chamber 13r of the injection piston 15, and a contact area of the plunger 5 with respect to the molten metal.

(Operation of Injection Apparatus)

The operation of the injection apparatus 1 having the above configuration will be explained next.

Figure 2:
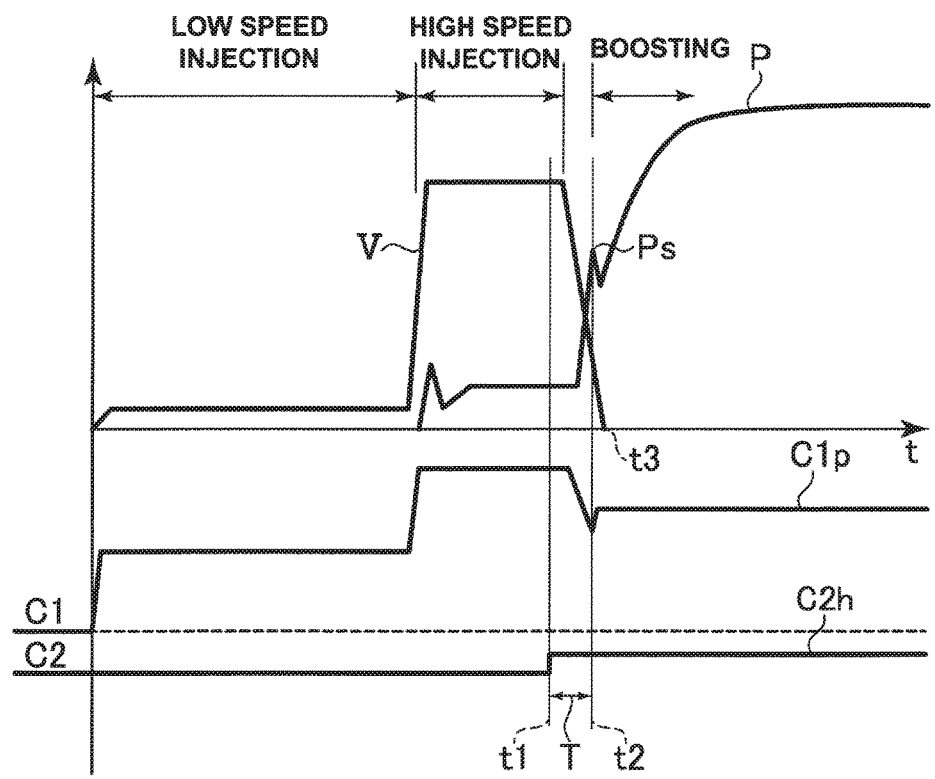
FIG. 2 A diagram for explaining the operation of the injection apparatus in FIG. 1.

FIG. 2 is a diagram for explaining the operation of the injection apparatus 1. In FIG. 2, an abscissa indicates the time (t). In an upper part in the diagram, an injection pressure P and an injection speed V are shown. An ordinate indicates their magnitudes. In a lower part in the diagram, a servo valve control command C1 and booster valve control command C2 are shown.

The servo valve control command C1 is a signal which is output by the control device 11 to the hydraulic pressure device 9 (more specifically the driver of the servo valve 35) in order to control the opening degree of the servo valve 35. The ordinate indicates the signal level thereof. In the example in FIG. 2, the higher the signal level, the larger the opening degree of the servo valve 35.

The booster valve control command C2 is a signal which is output by the control device 11 to the hydraulic pressure device 9 (more specifically the driver of the solenoid valve 59) in order to control the opening and closing of the booster valve 33. The ordinate indicates the signal level thereof. The booster valve control signal C2 is for example a binary signal. In the example in FIG. 2, when the signal level is low, the pilot pressure is introduced to the booster valve 33, and the booster valve 33 is closed.

The injection apparatus 1, seen overall, performs for example low speed injection, high speed injection, and boosting (pressure raising) in that order. That is, the injection apparatus 1, in an initial stage of the injection, moves the plunger 5 forward at a relatively low speed in order to prevent entrainment of air into the molten metal, then moves the plunger 5 forward at a relatively high speed from the viewpoint of filling the molten metal before the molten metal solidifies and so on. After that, the injection apparatus 1 boosts the pressure of the molten metal in the cavity by a force in the direction of forward movement of the plunger 5 so as to eliminate sinks etc. of the die casting. Specifically, this is as follows.

(Low Speed Injection)

Immediately before the start of the low speed injection, the injection apparatus 1 becomes the state shown in FIG. 1. That is, the injection piston 15 and booster piston 17 are positioned at the initial positions such as the retraction limits. The accumulator 25 has finished accumulating pressure. The injection valve 31 and booster valve 33 are closed, and release of hydraulic fluid from the accumulator 25 is prohibited. The accumulator valve 29 and servo valve 35 may be set to suitable states and are for example closed.

When the predetermined low speed injection start condition is satisfied, for example when the fixed mold 101 and moving mold 103 finish being clamped and the molten metal is supplied to the sleeve 3, the control device 11 controls the hydraulic pressure device 9 so as to supply hydraulic fluid to the head side chamber 13*h*. Due to this, the injection piston 15 and plunger 5 start forward movement, and low speed injection is carried out.

The hydraulic fluid may be supplied by for example the pump 23 by opening a not shown valve which is provided on a not shown flow path connecting the pump 23 and the head side chamber 13*h*. The pump 23 may be driven constantly as already explained or may be driven only at the time when supply of the hydraulic fluid becomes necessary in this way. Further, the hydraulic fluid may for example be supplied by the accumulator 25 by opening the injection valve 31 in place of the pump 23 as well.

Further, the control device 11 outputs the servo valve control command C1 at a suitable signal level in order to open the servo valve 35 with a suitable opening degree. Accordingly, along with the forward movement of the injection piston 15, the hydraulic fluid in the rod side chamber 13*r* is discharged through the servo valve 35 to the tank 21.

The speed V of the plunger 5 is controlled according to the opening degree of the servo valve 35. At this time, the servo valve 35 may be controlled by feedback based on the speed V of the plunger 5 which is acquired from the detection value of the position sensor 51. Note that, when the hydraulic fluid is supplied from the pump 23 to the head side chamber 13*h*, the speed of the plunger 5 may also be controlled by the control of the rotation speed of the electric motor 27 configured as a servo motor, (this control may also be feedback control.

(High Speed Injection)

When the position of the plunger 5 based on the detection value of the position sensor 51 reaches a predetermined high speed switching position, the control device 11 stops the supply of the hydraulic fluid from the pump 23 to the head side chamber 13*h* and opens the injection valve 31. Alternatively, the control device 11 maintains the opening state of the injection valve 31 subsequent to the low speed injection. Due to this, the hydraulic fluid is supplied from the accumulator 25 to the head side chamber 13*h*. Further, the control device 11 makes the opening degree of the servo valve 35 a suitable opening degree which is larger than the opening degree at the time of low speed injection.

Accordingly, the speed V of forward movement of the injection piston 15 and plunger 5 rises, so high speed injection is carried out. At the high speed injection, for example, the speed V which has reached the predetermined high speed injection speed is kept constant as it is. The speed V of the plunger 5 is controlled according to the opening degree of the servo valve 35. For example, the control device 11 controls the opening degree of the servo valve 35 by feedback based on the speed V of the plunger 5 which is acquired from the detection value of the position sensor 51. Note that, when the high speed injection is started, the injection pressure P becomes higher than that at the time of low speed injection.

(Decelerated Injection)

Decelerated injection (process between high speed injection and boosting in FIG. 2) is started due to occurrence of a suitable phenomenon. For example, the decelerated injection is started by the molten metal being filled in the cavity 105 to a certain extent and the plunger 5 receiving a counterforce from that filled molten metal and decelerating. Alternatively, decelerated injection is started by the opening degree in the servo valve 35 being made smaller (deceleration control being carried out) when a deceleration start condition is satisfied, for example when the plunger 5 reaches a predetermined deceleration position. Alternatively, it is started by the phenomena exemplified above simultaneously occurring.

In the example in FIG. 2, deceleration control of the injection speed V by the servo valve 35 is carried out. Specifically, for example, the control device 11 controls the signal level of the servo valve control command C1 to gradually become smaller (for example by a constant rate of change) from when the predetermined deceleration start condition is satisfied. That is, the control device 11 makes the opening degree of the servo valve 35 gradually smaller. Due to this, compared with a case where the plunger 5 is decelerated by only the counterforce which is received by the plunger 5 from the molten metal (a case where the deceleration control by the servo valve 35 is not carried out), for example, even in a case where the high speed injection speed is set relatively high, the deceleration of the plunger 5 is smoothly carried out, and consequently a suitable boosting characteristic can be obtained.

Note that, in the decelerated injection, the injection speed V falls compared with that at the high speed injection. However, the molten metal has been filled in the cavity 105 to a certain extent, therefore the injection pressure P becomes higher than that at the time of high speed injection.

(Boosting)

In the boosting process, the control device 11 outputs the booster valve control command C2 so as to open the booster valve 33. By opening the booster valve 33, hydraulic fluid is supplied from the accumulator 25 to the rear side chamber 13*g*. Further, the servo valve 35 has been opened, due to this, the front side chamber 13*f* is communicated with the tank 21 through the flow path 37E, rod side chamber 13*r*, and flow path 37D. Accordingly, as already explained, by the boosting function of the booster piston 17, a pressure higher than the pressure of the rear side chamber 13*g* (pressure of the accumulator 25) is given to the head side chamber 13*h*. Note that, the injection valve 31 closes by itself due to the pressure of the head side chamber 13*h* becoming higher than the pressure of the accumulator 25. However, a pilot pressure may be introduced so as to close it as well.

Further, in the injection process (low speed injection, high speed injection, and decelerated injection), the control device 11 controlled the opening degree of the servo valve 35 for control of the injection speed V. In the boosting process, it controls the opening degree of the servo valve 35 for control of the injection pressure P. That is, the control device 11 switches the control of the servo valve 35 from speed control to pressure control. Specifically, for example, the control device 11 performed feedback control for the opening degree of the servo valve 35 based on the detection speed by the position sensor 51 in the injection process as explained above, but sets the opening degree of the servo valve 35 at an opening degree determined in advance (that is, a constant value irrespective of the speed of the plunger 5) in the boosting process.

Note that, the switching of the servo valve 35 from the speed control to boosting control may be simple switching from the predetermined (constant) opening degree for high speed injection and decelerated injection to the predetermined (constant) opening degree for boosting different in magnitude from the former. Further, in the boosting control of the servo valve 35, the control device 11 may perform feedback control of the opening degree of the servo valve 35 so that the injection pressure P based on the detection values of the head side pressure sensor 55 and rod side pressure sensor 57 rises along with a predetermined boosting curve.

According to the control of the booster valve 33 and servo valve 35 described above, the injection pressure P gradually rises after the decelerated injection. That is, the pressure is boosted. Note that, at the transition from the decelerated injection to the boosting, so-called surge pressure Ps is generated due to the molten metal filling the cavity 105 to a certain extent. The injection pressure P which rises due to the boosting reaches the ending pressure in the course of time. Further, the injection speed V becomes zero (the plunger 5 stops) by completion of filling of the molten metal in the cavity 105. Note that, very strictly speaking, the plunger 5 moves forward a little even after that. However, in the following explanation, basically that forward movement will be ignored.

Note that, the ending pressure may be determined by the pressure of the accumulator 25 (head side chamber 13*h*) as a result of hydraulic fluid at the rod side chamber 13*r* being discharged until the pressure in the rod side chamber 13*r* becomes equal to the tank pressure. Alternatively, the discharge of the hydraulic fluid from the rod side chamber 13*r* may be prohibited by the servo valve 35 etc. before the pressure in the rod side chamber 13*r* becomes equal to the tank pressure, and the ending pressure may be determined by the pressure of the rod side chamber 13*r* and the pressure of the accumulator 25 at that time.

Here, one of characteristic features of the injection apparatus 1 in the present embodiment is that the control of the servo valve 35 is switched from speed control to pressure control (time t2) after the start of the output of the control command for opening the booster valve 33 (after the time t1). This will be explained later.

(Holding of Pressure)

The control device 11 maintains the state where the injection pressure P has become the ending pressure as described above. During this period, the molten metal is cooled and solidifies. When the molten metal solidifies, the control device 11 closes the booster valve 33. Due to this, the supply of hydraulic pressure from the accumulator 25 to the rear side chamber 13*g* is stopped and the pressure holding action ends.

Note that, the control device 11 suitably judges whether the molten metal has solidified. For example, the control device 11 judges whether the molten metal has solidified according to whether a predetermined time period has passed from a predetermined time such as the time when the ending pressure was obtained.

(Retraction of Plunger)

After the end of the pressure holding action, the control device 11 for example opens a not shown valve which is provided at a not shown flow path connecting the pump 23 and the rod side chamber 13*r* and supplies hydraulic fluid to the rod side chamber 13*r*. Due to this, the injection piston 15 and the plunger 5 retract. The servo valve 35 may be provided in that supply passage and may be opened, or may not be provided in the supply passage and may be closed. The hydraulic fluid discharged from the head side chamber 13*h* along with the retraction of the injection piston 15 is for example stored in the tank 21 by opening a not shown valve which is provided in the not shown flow path connecting the head side chamber 13*h* and the tank 21. Further, the hydraulic fluid from the pump 23 is supplied through the rod side chamber 13*r* to the front side chamber 13*f* as well, so the booster piston 17 also retracts. The hydraulic fluid discharged from the rear side chamber 13*g* along with the retraction of the booster piston 17 is for example stored in the tank 21 by opening a not shown valve which is provided in the not shown flow path connecting the rear side chamber 13*g* and the tank 21.

(Filling of Accumulator)

After the end of the pressure holding action, the injection apparatus 1 fills the accumulator 25 before or after the retraction of the plunger 5 described above or simultaneously with the retraction of the plunger. Specifically, the control device 11 stops introduction of the pilot pressure to the accumulator valve 29 and supplies hydraulic fluid from the pump 23 to the accumulator 25. When the detection pressure of the accumulator pressure sensor 53 reaches a predetermined pressure, the control device 11 closes the accumulator valve 29.

(Timing of Control Command for Boosting)

As explained above, in the present embodiment, one of the characteristic features resides in that the control device 11 performs control so as to switch the control of the servo valve 35 from the speed control to the pressure control (time t2) after the start of the output of the control command C2*h* for opening the booster valve 33 (after the time t1).

Note that, the control command C2*h* for opening the booster valve 33 is, in the example in FIG. 2, the part of the booster valve control command C2, which is after the time t1 and in which the signal level is made the high level in the binary value. The timing of switching the control of the servo valve 35 from the speed control to the pressure control is, in other words, the output start timing of the control command C1*p* for the pressure control. The control command C2*h* for the pressure control is, in the example in FIG. 2, the part of the servo valve control command C1, which is after the time t2 and in which the signal level becomes a bit high and then is made constant.

Specifically, first, the output of the control command C2*h* for opening the booster valve 33 is for example started when the position of the plunger 5 detected by the position sensor 51 reaches a predetermined boosting start position (when the control device 11 judges this). Further, the output of the control command C1*p* for the pressure control is for example started when a predetermined delay time T has passed from when the position of the plunger 5 reached the boosting start position (when the control device 11 judges this). Due to this, the output of the control command C1*p* is started after the output of the control command C2*h* is started.

Here, desirably the forward movement of the booster piston 17 is started before the time t3 when the plunger 5 stops (filling is completed). On the other hand, a control delay arises from when the control command C2*h* for opening the booster valve 33 is output to when the forward movement of the booster piston 17 is started. As the reason for that, for example, a delay occurs from the output of the control command C2*h* to the opening of the booster valve 33 since the booster valve 33 is controlled by introduction of the pilot pressure, and a delay occurs from when the booster valve 33 is opened to when the pressure in the rear side chamber 13*g* rises due to contraction of hydraulic fluid etc. Therefore, the boosting start position is suitably set in accordance with for example the speed setting of the plunger 5, set value (predetermined value) of the biscuit thickness, and/or time of delay of control of the booster piston 17 etc. so that the booster piston 17 starts forward movement before the plunger 5 reaches the predetermined position of stopping.

Further, the servo valve 35 desirably becomes the opening degree for pressure control near the time t3 when the plunger stops. On the other hand, the control delay of the servo valve 35 is shorter compared with the above control delay before the booster piston 17 moves forward. Accordingly, if output of the control command C1p for the pressure control of the servo valve 35 is started when the plunger 5 reaches the boosting start position explained above, the timing at which the opening degree of the servo valve 35 becomes the opening degree for the pressure control becomes earlier than the stopping time t3 of the plunger 5. Therefore, the delay time T is suitably set in accordance with for example the position at which the boosting start position is set, the control delay of the servo valve 35, the speed setting of the plunger 5, the set value of the biscuit thickness, and/or the time of control delay of the booster piston 17 etc. so that the opening degree for the pressure control is obtained near the position where the plunger 5 reaches the predetermined position for stopping.

The boosting start position may be automatically determined by the control device 11 based on the above information contributing to the setting or may be input through the input device 47 by a worker. In the same way, the delay time T may be automatically determined by the control device 11 based on the above information contributing to the setting or may be input through the input device 47 by a worker. Note that, when a worker can set the delay time T, it may be possible to set the delay time T at 0 as well. Further, for the boosting start position and delay time T, suitable values may be found based on calculation formulas or suitable values may be found by repeated test operation and so on.

As described above, in the present embodiment, the injection apparatus 1 has a booster type injection cylinder 7 connected to a plunger 5, a hydraulic pressure device 9 including an accumulator 25 etc. capable of supplying hydraulic fluid to a back of an injection piston 15 of the injection cylinder 7, and a control device 11 for controlling the hydraulic pressure device 9. The hydraulic pressure device 9 has a servo valve 35 capable of controlling discharge of hydraulic fluid from a front of the injection piston 15 and a booster valve 33 for controlling the supply of hydraulic fluid to the back of the booster piston 17 of the injection cylinder 7. The control device 11 outputs a control command to the hydraulic pressure device 9, thereby performs injection (in a narrow sense not including the boosting) by supplying the hydraulic fluid from the accumulator 25 to the back of the injection piston 15 and, at this time, executes the speed control to control the speed of the plunger 5 by the opening degree of the servo valve 35. Further, the control device 11 outputs the control command to the hydraulic pressure device 9, thereby performs the boosting by opening the booster valve 33 to supply the hydraulic fluid to the back of the booster piston 17 and pressurizing the hydraulic fluid behind the injection piston 15 by the booster piston 17 and, at this time, executes the pressure control to control the pressure of the molding material by the opening degree of the servo valve 35. Further, the control device 11 can start output of the control command C1p for the pressure control after start of output of the control command C2h for opening the booster valve 33 in the transition from injection to boosting.

Accordingly, the boosting characteristic can be improved. Specifically, for example, it is possible to start output of the control command C2h for opening the booster valve 33 early and reduce the chance of the booster piston 17 starting forward movement with a delay from the stopping of the plunger 5. In turn, the chance of a period arising during which the injection pressure P does not rise (generation of boosting time lag) after stopping the plunger 5 can be reduced and the chance of burrs or sinks being caused can be reduced. On the other hand, by outputting the control command C1p for the pressure control after the control command C2h, the chance of the servo valve 35 opening during a period when the molten metal is not sufficiently filled in the mold 100 can be reduced. As a result, the chance of a temporary increase of speed occurring before the plunger 5 stops and thereby burrs being formed can be reduced. In this way, both formation of sinks or mold cavities and formation of burrs can be reduced.

Note that, the improvement of the boosting characteristic due to suitable setting of the timing when the pressure control of the servo valve 35 is started is particularly effective when the difference between the opening degree of the servo valve 35 at the time of speed control and the opening degree of the servo valve 35 at the time of pressure control is large. For example, compared with a case where the high speed injection speed is relatively low, therefore the necessity of deceleration control is low, and deceleration control is not carried out (even in the decelerated injection, the opening degree of the servo valve 35 is kept at the opening degree for high speed injection as it is), in a case where the high speed injection speed is relatively high and deceleration control is carried out, the amount of increase of the opening degree at the time of pressure control relative to the opening degree at the time of deceleration control is relatively large. As a result, compared with the former case, the boosting characteristic is improved more remarkably than in the latter case.

Problem Occurring in First Embodiment

The second embodiment is an improvement over the first embodiment. The problem which occurs in the first embodiment will be explained preceding the explanation of the second embodiment.

The amount of the molten metal which is supplied to the sleeve 3 varies among a plurality of cycles. From another viewpoint, the biscuit thickness varies. As the main cause for that, for example, there can be mentioned the change of the level of the hot metal of the molten metal in a holding furnace from which the molten metal is scooped out by a ladle, sticking of the molten metal to the ladle, and dripping of the molten metal from the ladle. Due to this variation of biscuit thickness, the position at which the plunger 5 receives the predetermined counterforce from the molten metal in the cavity 105 and decelerates and the stopping position of the plunger 5 etc. vary as well. As a result, the time when the predetermined delay time T has passed from when the boosting start position was reached is liable to no longer be suitable as the time for start of output of the control command C1p for the pressure control of the servo valve 35.

Figure 3:
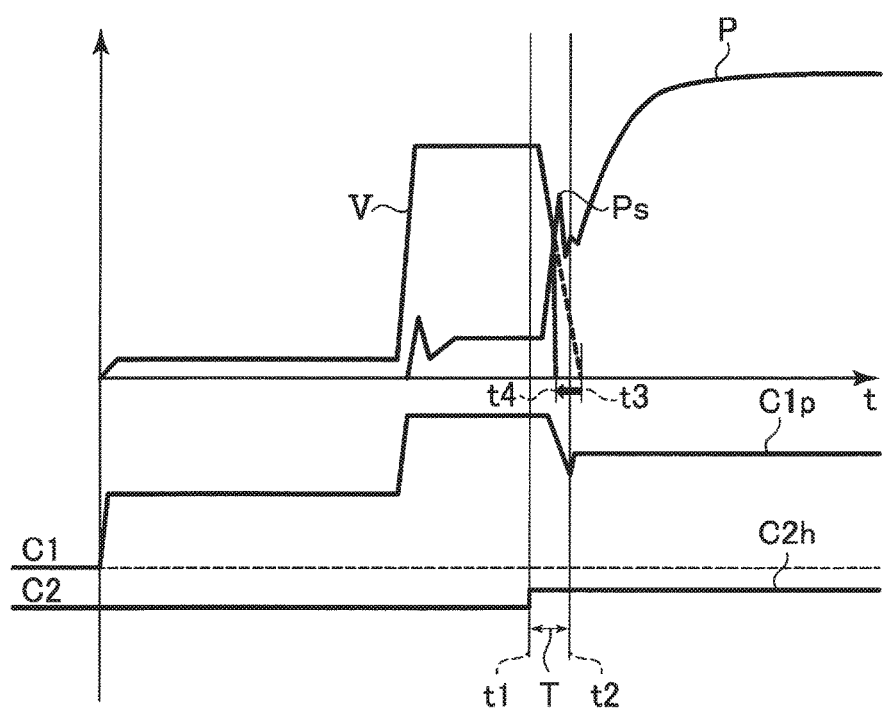
FIG. 3 A diagram for explaining an example of the problem which may occur in the operation in FIG. 2.

FIG. 3 is a diagram corresponding to FIG. 2 in a case where the biscuit thickness becomes larger relative to the set value. Note that, FIG. 2 corresponds to the case where the biscuit thickness roughly coincides with the set value.

The variation of the total amount of supply of hot metal (biscuit thickness) has almost no influence upon the speed control at the low speed injection and high speed injection (in a narrow sense not including the decelerated injection). Accordingly, in FIG. 3, the changes of the injection speed V at the low speed injection and at the high speed injection are roughly the same as those in FIG. 2. That is, the operation of the plunger 5 in the example in FIG. 3 is roughly the same as that in the example in FIG. 2.

In the example in FIG. 3, however, the biscuit thickness is larger than the set value, therefore the plunger 5 receives a relatively large counterforce from the molten metal at an earlier timing than that in the example in FIG. 2. As a result, in FIG. 3, the injection speed V becomes zero earlier (time t4) than the injection speed V in FIG. 2 (indicated by a dotted line in FIG. 3). The larger the biscuit thickness, the larger the time difference between t3 and t4.

Further, in the first (and second) embodiment, in the decelerated injection, the opening degree of the servo valve 35 is made smaller than that at the high speed injection as deceleration control. However, the injection speed V is decelerated with a steeper gradient than the gradient of change of speed (degree of acceleration) according to that deceleration control. The time when the deceleration with that steep gradient is started becomes earlier as the biscuit thickness becomes larger. Note that, FIG. 3 exemplifies a case where the deceleration with a steep gradient is started after the deceleration control is started.

The output start time t1 of the control command C2h for opening the booster valve 33 is determined based on the position of the plunger 5 at the high speed injection. On the other hand, as explained above, the operation of the plunger 5 up to the high speed injection in the example in FIG. 3 is the same as that in the example in FIG. 2. Accordingly, the change of the booster valve control command C2 in FIG. 3 is the same as that in FIG. 2. Further, the output start time t2 of the control command C1p for the pressure control of the servo valve 35 is determined based on the above time t1 based on the position of the plunger 5 and the predetermined delay time T. Accordingly, in the same way as the booster valve control command C2, the change of the servo valve control command C1 in FIG. 3 is the same as that in FIG. 2.

Note that, if the biscuit thickness is very large relative to the set value, the time when the deceleration with a steep gradient is started arrives before the timing when the high speed injection should be completed and arrives before the plunger 5 reaches the boosting start position. In this case, the timings of changes of the booster valve control command C2 and the servo valve control command C1 become different from those in FIG. 2. In the first (and second) embodiments, even at the maximum value of the biscuit thickness which may be realistically formed with a certain degree of frequency, it is assumed that the boosting start position is set so that the plunger 5 reaches the boosting start position before the deceleration with a steep gradient is started. The explanation of the above such case will be omitted.

As described above, in the example in FIG. 3, the output start time t1 of the control command C2h for opening the booster valve 33 and the output start time t2 of the control command C1p for the pressure control of the servo valve 35 are the same as those in the example in FIG. 2. On the other hand, the stopping time t4 of the plunger 5 becomes earlier than the stopping time t3 in the example in FIG. 2. Accordingly, the timing when the opening degree of the servo valve 35 becomes the opening degree for pressure control from the opening degree for speed control is delayed relative to the stopping time t4 of the plunger 5. The change from the opening degree for speed control to the opening degree for pressure control is for example a change whereby the opening degree becomes larger from the opening degree throttled by deceleration control.

As a result, for example, in response to the pressure control of the servo valve 35 being started (for example the opening degree being made larger) after the generation of surge pressure, vibration is liable to occur in the boosting curve (near the time t3). Further, for example, the entire boosting curve is delayed relative to the stopping of the plunger 5 (boosting time lag occurs). In this way, the ideal boosting characteristic is liable to not be obtained.

Note that, the output start time t1 of the control command C2h for opening the booster valve 33 also approaches the stopping time t4 of the plunger 5. However, the forward movement start time of the booster piston 17 need only be a start time not delayed from the stopping time of the plunger 5 and need not be a time so close to the stopping time of the plunger 5 compared with the switching of control of the servo valve 35. Accordingly, by setting the boosting start position to be advanced to a certain extent (it is necessary to extend the delay time T as well along with this) considering the maximum value of the biscuit thickness which may realistically occur with a certain degree of frequency, the control delay of the booster piston 17, and so on, variations resulting in the biscuit thickness becoming greater can be coped with.

Figure 4:
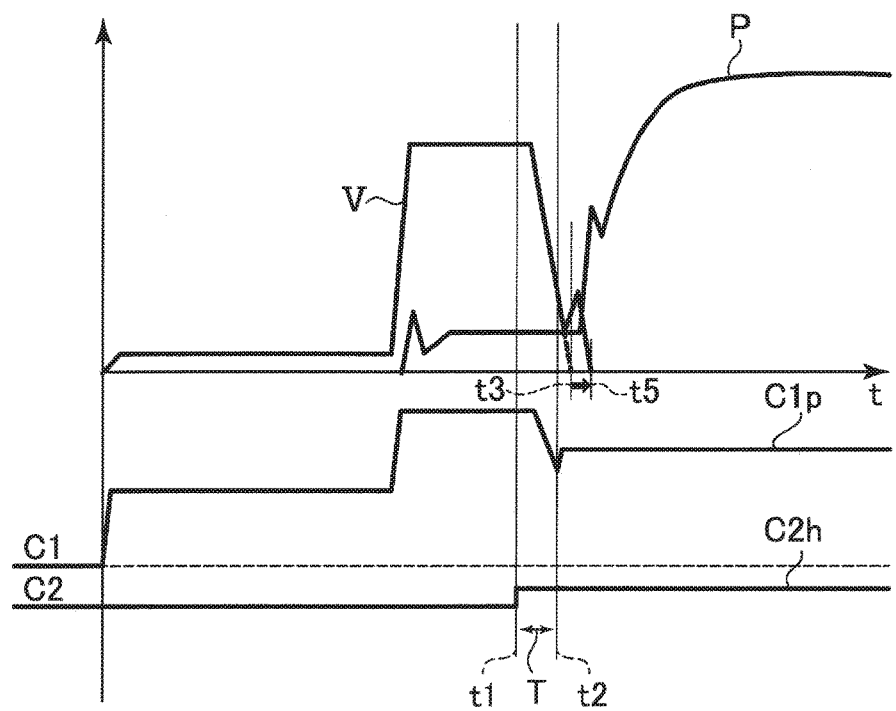
FIG. 4 A diagram for explaining another example of the problem which may occur in the operation in FIG. 2.

FIG. 4 is a diagram corresponding to FIG. 2 in a case where the biscuit thickness becomes small relative to the set value.

As explained above, the variation of the amount of supply of hot metal (biscuit thickness) exerts almost no influence upon the speed control at the low speed injection and high speed injection. Consequently, in FIG. 4, the changes of the injection speed V at the low speed injection and at the high speed injection and the changes in the booster valve control command C2 and the servo valve control command C1 are the same as those in FIG. 2.

In the example in FIG. 4, however, the biscuit thickness is smaller than the set value, therefore the time t5 when the plunger 5 receives the counterforce from the molten metal in the cavity 105 and stops becomes later than the stopping time t3 in the example in FIG. 2.

Accordingly, the time t2 when the pressure control of the servo valve 35 is started becomes earlier than the time t5 when the plunger 5 stops. From another viewpoint, at the time t2, the molten metal is not sufficiently filled in the cavity 105 (for example a surge pressure is not generated).

As a result, for example, in response to the pressure control of the servo valve 35 being started (for example the opening degree being made large), the injection speed V rises once before it becomes 0 (before the time t5). Such a speed increase before the stopping of the plunger 5 is liable to cause burrs.

Note that, the output start time t1 of the control command C2h for opening the booster valve 33 is separated from the stopping time t5 of the plunger 5. However, as already explained, the forward movement start time of the booster piston 17 only have to be started without being delayed from the stopping point of the plunger 5, so this does not become that much of a problem.

As explained above with reference to FIG. 3 and FIG. 4, in the first embodiment, the boosting characteristic is liable to fall due to fluctuation of the biscuit thickness. Note that, in the first embodiment as well, in a case where the variation of the amount of supply of hot metal is relatively small (for example, the variation of the amount of supply of hot metal is within 2% of the set value), the inconvenience such as shown in FIG. 3 and FIG. 4 does not arise or does not become that much of a problem. In the second embodiment which will be explained below, even in a case where the variation of the amount of supply of hot metal is relatively large (for example the variation of the amount of supply of hot metal exceeds 2% of the set value), the chance of occurrence of the inconvenience such as shown in FIG. 3 and FIG. 4 is reduced and consequently the frequency of causing defective products can be lowered.

Second Embodiment

The configuration (structure) of the injection apparatus in the second embodiment is the same as that in the first embodiment. Accordingly, in the second embodiment as well, use is made of the notations of the injection apparatus 1 in the first embodiment. The injection apparatus 1 in the second embodiment differs from the injection apparatus 1 in the first embodiment only in the control by the control device 11.

More specifically, first, in the second embodiment, the method of determination of the output start timing of the control command C1$p$ differs from that in the first embodiment. Further, it differs in the point that a predetermined warning operation is carried out in a case where it is anticipated that the boosting curve will not be suitable. Note, the warning operation can be applied to the first embodiment as well.

Figure 5:
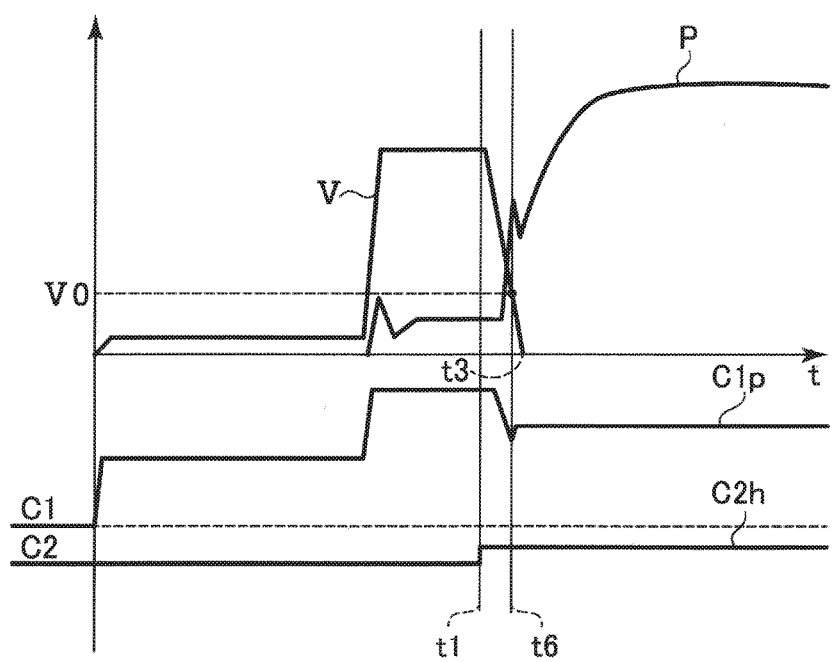
FIG. 5 A diagram for explaining the operation of an injection apparatus according to a second embodiment of the present invention.

FIG. 5 is a diagram corresponding to FIG. 2 for explaining the operation of the injection apparatus 1 in the second embodiment. Further, FIG. 5 corresponds to a case where the biscuit thickness roughly coincides with the set value.

In the second embodiment, the control device 11 starts output of the control command C1$p$ for the pressure control of the servo valve 35 when the speed V of the plunger 5 which has been decelerated falls to the predetermined boosting start speed V0 (time t6) based on the detection value of the position sensor 51. The boosting start speed V0 is a speed which is faster than at least 0 but is slower than at least the high speed injection speed.

When the biscuit thickness is large, the plunger 5 receives a counterforce from the molten metal and decelerates relatively early. Accordingly, both the time t6 (variable in the present embodiment) when the injection speed V reaches the boosting start speed V0 and the time when the plunger 5 stops (t3 in FIG. 5) arrive relatively early. Conversely, when the biscuit thickness is small, the two times arrive relatively late. That is, the time t6 when the boosting start speed V0 is reached is correlated with the stopping time (t3) of the plunger 5. As a result, output of the control command C1$p$ for the pressure control of the servo valve 35 can be started at a suitable timing with respect to the stopping time (t3) of the plunger 5.

The boosting start speed V0 is suitably set so that the servo valve 35 becomes the opening degree for the pressure control near the stopping point (t3) of the plunger 5 in accordance with for example the gradient of the speed in the deceleration control (degree of acceleration), the gradient of the speed at the time when the plunger 5 is suddenly decelerated due to the counterforce from the molten metal, the control delay of the servo valve 35, and so on. Note that, the boosting start speed V0 may be determined by the control device 11 based on information such as the set value of the amount of supply of hot metal, set value of the high speed injection speed, gradient of the speed in the deceleration control, and/or control delay of the servo valve 35 or may be determined by a worker and be input through the input device 47 to the control device 11. Further, as the boosting start speed V0, a suitable value may be found based on a calculation formula or a suitable value may be found by repeated test operations.

Figure 6:
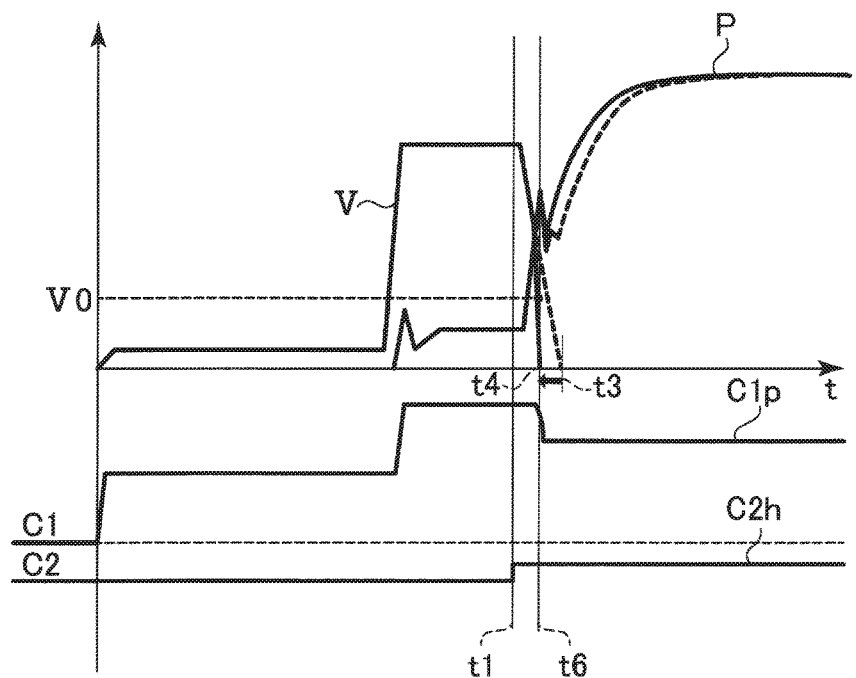
FIG. 6 A diagram for explaining the solution of the problem in FIG. 3 according to the operation in FIG. 5.

FIG. 6 is a diagram for explaining the operation of the injection apparatus 1 in the second embodiment in a case where the biscuit thickness becomes larger relative to the set value and corresponds to FIG. 3 in the first embodiment. In FIG. 6, the injection speed V (injection speed V in FIG. 2 and FIG. 5) at the time when the biscuit thickness coincides with the set value and injection pressure P in FIG. 3 are also indicated by dotted lines.

When the biscuit thickness is larger than the set value, the injection speed V, in the same way as the injection speed V in FIG. 3, is decelerated early with a steep gradient due to the counterforce from the molten metal in the cavity 105 and becomes 0 early (time t4). In this case as well, in the present embodiment, when the injection speed V reaches the boosting start speed V0, that is, in other words, at the time t6 (note, it overlaps the time t4 because of the limit of illustration in FIG. 6), which is before the time t4 when the injection speed V becomes 0, output of the control command C1$p$ for the pressure control of the servo valve 35 is started.

As a result, for example, the chance of occurrence of a temporary rise of the injection speed V due to the opening degree of the servo valve 35 becoming large after stopping the plunger 5 as explained with reference to FIG. 3 is reduced. Further, for example, the boosting curve can be raised early in accordance with the stopping of the plunger 5 in an early stage (the boosting time lag can be minimized).

Note that, FIG. 6 exemplifies a case where the pressure control is started before the signal level of the servo valve control command C1 in the deceleration control falls to the signal level at the time of pressure control. In this case, in the transition from the deceleration control to the pressure control, the opening degree of the servo valve 35 is not made large, but is made small.

The fact that the problem occurring in the first embodiment was solved for the case where the biscuit thickness is larger than the set value was illustrated above. However, the problem which arises in the first embodiment is solved in the same way even in the case where the biscuit thickness is smaller than the set value. Specifically, although it is not particularly shown, output of the control command C1$p$ for the pressure control of the servo valve 35 is started delayed in response to the stopping of the plunger 5 becoming delayed. As a result, for example, the chance of occurrence of an increase of speed before the stopping of injection which was explained with reference to FIG. 4 is reduced.

Note, in a case where the deceleration control is carried out and the amount of reduction of the biscuit thickness relative to the set value thereof is relatively large and so on, in the second embodiment as well, the opening degree of the servo valve 35 is liable to end up becoming the opening degree for the pressure control before the plunger 5 stops (before the filling is completed).

Therefore, the control device 11 judges whether the stopping position of the plunger 5 exceeds a predetermined threshold value. This judgment is equivalent to the judgment of whether the biscuit thickness is reduced by a predetermined amount or more from the set value. Further, when judging that the stopping position exceeds the threshold value, the control device 11 performs predetermined warning control. The warning control for example makes the display device 49 display a predetermined warning image (including text), change a lighting state of a not shown lamp, and/or output a predetermined warning sound.

Figure 7:
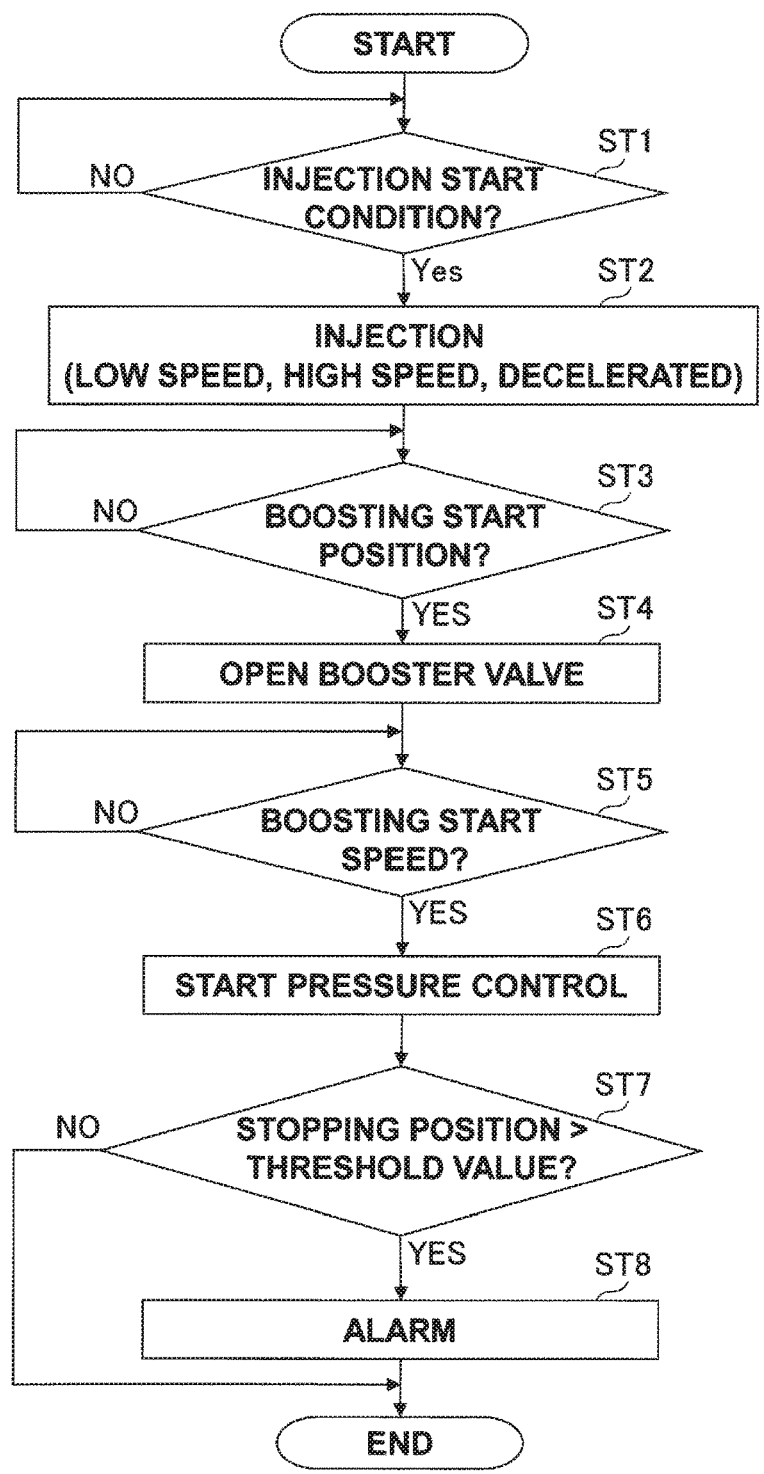
FIG. 7 A flow chart showing a routine for processing which is executed by a control device for realizing the operation in FIG. 5.

FIG. 7 is a flow chart showing a routine of processing which is performed by the control device 11 in order to realize the operation explained above. This processing is carried out for each molding cycle.

First, at step ST1, the control device 11 judges whether the predetermined injection start conditions are satisfied. The routine proceeds to step ST2 when judging that they are satisfied, while repeats step ST1 when judging that they are not satisfied. The injection start conditions were already explained.

At step ST2, the control device 11 outputs a control command to the hydraulic pressure device 9 so as to perform the injection process (low speed injection, high speed injection, and decelerated injection). The concrete operation of the hydraulic pressure device 9 at this time was already explained.

At step ST3, the control device 11 judges whether the position of the plunger 5 based on the detection value of the position sensor 51 reaches the boosting start position (including judgment of whether it exceeds it). The routine proceeds to step ST4 when judging that the former reaches the latter, while it stands by (continues the control of the injection process) when judging that the former does not reach the latter.

At step ST4, the control device 11 starts outputting the control command C2h for opening the booster valve 33.

At step ST5, the control device 11 judges whether the speed of the plunger 5 based on the detection value of the position sensor 51 reaches the boosting start speed (including judgment whether the former becomes lower than the latter). The routine proceeds to step ST6 when judging that the former reaches the latter, while stands by (continues the speed control of the servo valve 35) when judging that the former does not reach the latter.

At step ST6, the control device 11 starts outputting the control command C1p for the pressure control of the servo valve 35.

At step ST7, the control device 11 judges whether the stopping position of the plunger 5 based on the detection value of the position sensor 51 exceeds a predetermined threshold value. Note that, although not shown, preceding to this step, the control device 11 judges whether the speed of the plunger 5 based on the detection value of the position sensor 51 has become 0 and defines the position of the plunger 5 at the time when judging it becomes 0 as the stopping position. The control device 11 proceeds to step ST8 when judging that the position of the plunger 5 exceeds the threshold value, while it skips step ST8 when judging that the former does not exceed the latter.

At step ST8, the control device 11 performs the warning control for executing a predetermined alarm display etc. as explained above.

Note that, in the first embodiment, at step ST5, in place of the judgment of whether the speed V of the plunger 5 reaches the boosting start speed it is judged whether the delay time T has elapsed from the time of step ST3. Even in the first embodiment, steps ST7 and ST8 may be executed as already explained.

As described above, in the second embodiment, in the same way as the first embodiment, the control device 11 can start outputting the control command C1p for the pressure control after starting output of the control command C2h for opening the booster valve 33. Accordingly, for example, in the same way as the first embodiment, both of the chance that the start of the forward movement of the booster piston 17 becomes too delayed relative to the stopping of the plunger 5 and the chance that the start of the pressure control of the servo valve 35 becomes too early relative to the stopping of the plunger 5 can be reduced. That is, the boosting characteristic can be improved. As a result, for example, both sinks and mold cavities and burrs can be reduced.

Further, in the second embodiment, the control device 11 starts output of the control command C2h for opening the booster valve 33 when the position of the plunger 5 reaches a predetermined boosting start position (time t1) (steps ST3 and ST4). After that, when a physical quantity (speed V in the embodiment) which may fluctuate among a plurality of cycles in accordance with variation of the amount of supply of hot metal to the sleeve 3 among a plurality of cycles even if the position of the plunger 5 exists at the same position among a plurality of cycles reaches a predetermined switching judgment value (boosting start speed V0 in the embodiment) (time t6), output of the control command C1p for the pressure control is started (steps ST5 and ST6).

Accordingly, for example, the output start timing of the control command C1p for the pressure control can be changed in accordance with the variation of the amount of supply of hot metal (biscuit thickness). As a result, as already explained, the problem explained with reference to FIG. 3 and FIG. 4 is solved.

Further, for example, the output start timing of the control command C2h for opening the booster valve 33 is judged based on the boosting start position and is not influenced by the setting of the switching judgment value (boosting start speed V0), therefore the switching judgment value can be set to the optimum value without considering the control delay etc. of the booster valve 33 and paying attention to only the operation of the servo valve 35. As a result, for example, the switching judgment value can be made a value closer to the value (0) of the physical quantity (speed V) at the time when the plunger 5 stops than the conventional value. Consequently, the time from when the physical quantity reaches the switching judgment value to when the plunger 5 stops and the variation thereof can be made smaller compared with the conventional values. As a result, the start timing of the pressure control of the servo valve 35 is made much more suitable.

Further, for example, setting the boosting start position for determining the output start timing of the control command C2h for opening the booster valve 33 does not influence the start timing of the pressure control of the servo valve 35 so much. Therefore, in the case where the amount of increase of the biscuit thickness is relatively large (for example a case where the amount of increase of the supply of hot metal exceeds 2% of the set value of the amount of supply of hot metal), the position can be set sufficiently in advance. As a result, for example, even when an increase of the biscuit thickness which had made it impossible to mold a good product in the past occurs, a good product can be produced.

Further, in the present embodiment, the control device 11 starts outputting the control command C1p for the pressure control at the time when the speed V of the plunger 5 as the physical quantity falls to the boosting start speed V0 as the switching judgment value.

According to experiments by the applicant of the present application, in a case where the speed of the plunger 5 is selected as the physical quantity for judging the start of the pressure control of the servo valve 35, compared with a case where another physical quantity (for example injection pressure P) is selected, the boosting curve is apt to become most suitable. Further, when the speed V is selected, the start of the pressure control of the servo valve 35 can also be judged based on the detection value of the position sensor 51 for judging the start timing of high speed injection and/or the timing of opening the booster valve 33, therefore it is not necessary to newly provide a sensor, so the configuration is simplified.

Further, in the present embodiment, the injection apparatus 1 is further provided with the display device 49, and the control device 11 makes the display device 49 display a predetermined alarm display in a case where the position of the plunger 5 when the plunger 5 stops due to the completion of filling of the molten metal into the mold 100 exceeds a predetermined threshold value (steps ST7 and ST8).

Accordingly, for example, the injection apparatus 1 can judge the quality of a die casting conveniently and early in a case where the amount of reduction of the biscuit thickness relative to the set value is relatively large. As a result, the load of the worker is lightened and reduced.

Note that, the first and second embodiments can be grasped from the viewpoint of a method as well. For example, the molding method in the present embodiment is a molding method using an injection apparatus 1 provided with an injection cylinder 7 which is connected to a plunger 5 for injecting molten metal in a sleeve 3 into a mold 100 and with a hydraulic pressure device 9 having a servo valve 35 capable of controlling discharge of hydraulic fluid from the front of an injection piston 15 of the injection cylinder 7 and a booster valve 33 for controlling the supply of hydraulic fluid to the back of the booster piston 17 of the injection cylinder 7. It has a hydraulic fluid supplying step of supplying hydraulic fluid to the back of the injection piston 15 for injection (step ST2), a speed control command step for commanding the hydraulic pressure device 9 to perform speed control for controlling a speed of the plunger 5 by an opening degree of the servo valve 35 at the time of injection (up to the time t1 at step ST2), a booster valve opening command step for commanding the hydraulic pressure device 9 open the booster valve 33 for the boosting (step ST4), and a pressure control command step for commanding the hydraulic pressure device 9 to perform pressure control for controlling the pressure of the molten metal by the opening degree of the servo valve 35 at the time of the boosting (step ST6). After the start of the booster valve opening command step, the pressure control command step is started.

In the above embodiments, the die cast machine DC1 is one example of the molding apparatus, the accumulator 25 is one example of the hydraulic pressure source, the speed V of the plunger 5 is one example of the physical quantity, the boosting start speed is one example of the switching judgment value, and the molten metal is one example of the molding material. Further, the servo valve 35 is one example of the injection control valve.

The present invention is not limited to the above embodiments and may be worked in various ways.

The molding machine is not limited to a die cast machine. For example, the molding machine may be another metal molding machine, may be a plastic injection molding machine, or may be a molding machine for molding a material comprised of sawdust to which a thermoplastic resin or the like is mixed. Further, the injection apparatus is not limited to a horizontal clamping and horizontal injection type and may be for example a vertical clamping and vertical injection type, horizontal clamping and vertical injection type, or vertical clamping and horizontal injection type as well. The hydraulic fluid is not limited to oil and may be for example water as well.

The physical quantity for judging the start of the pressure control of the servo valve is not limited to the speed of the plunger. As the physical quantity, use can be made of various quantities which can fluctuate among a plurality of cycles due to variation of the amount of supply of the molding material into the sleeve (biscuit thickness) among a plurality of cycles even if the position of the plunger is at the same position among a plurality of cycles. For example, the physical quantity may be the pressure of the molding material as well. This pressure may be for example directly detected by the pressure sensor provided in the cavity or indirectly found from pressures of the hydraulic fluids in front and back of the injection piston as in the embodiment. Further, for example, the physical quantity may be a front end position of the molding material as well. More specifically, for example, a sensor for detecting the arrival of the molding material may be provided at a suitable position in the cavity and it may be judged whether the molding material reaches that position of the sensor (one example of the switching judgment value).

The injection apparatus is not limited to one performing all process including injection and boosting by hydraulic pressure. For example, the low speed injection may be carried out by transmission of the driving power of an electric motor to the plunger without the interposition of hydraulic fluid as well. That is, the injection apparatus need not be a full hydraulic type, but may be a so-called hybrid type.

The configuration of the hydraulic pressure device may be suitably changed. For example, provision may be made of a run-around circuit circulating the hydraulic fluid of the rod side chamber to the head side chamber along with the forward movement of the injection piston. This run-around circuit may be utilized in part of the injection (in a narrow sense not including boosting) (for example low speed injection) or may be utilized throughout the entire process. Further, for example, the hydraulic pressure device may be one wherein a meter-out circuit is used as the meter-in circuit as well.

Priority is claimed on Japanese application No. 2015-002899, filed on Jan. 9, 2015, the content of which is incorporated herein by reference.

REFERENCE SIGNS LIST

1 . . . injection apparatus, 3 . . . sleeve, 5 . . . plunger, 7 . . . injection cylinder, 9 . . . hydraulic pressure device, 11 . . . control device, 15 . . . injection piston, 17 . . . booster piston, 25 . . . accumulator (hydraulic pressure source), 35 . . . servo valve (injection control valve), 33 . . . booster valve, and 100 . . . mold.

The invention claimed is:

1. An injection apparatus comprising:
a plunger injecting a molding material into a mold;
an injection cylinder having an injection piston connected to said plunger and a booster piston capable of pressurizing a hydraulic fluid in back of said injection piston;
a hydraulic pressure device having
a hydraulic pressure source capable of supplying said hydraulic fluid to the back of said injection piston,
an injection control valve capable of controlling the discharge of said hydraulic fluid from the front of said injection piston, and
a booster valve for controlling the supply of the hydraulic fluid to the back of said booster piston;
a position sensor which detects the position of the plunger; and
a control device for controlling said hydraulic pressure device, wherein
said control device
outputs control commands to said hydraulic pressure device so as to
supply hydraulic fluid from said hydraulic pressure source to the back of said injection piston to thereby perform injection and, at that time, execute feedback control of speed based on a detected value of the position sensor to control the speed of said plunger by an opening degree of said injection control valve, and to open said booster valve to supply hydraulic fluid to the back of said booster piston and use said booster piston to pressurize the hydraulic fluid behind said injection piston to thereby perform boosting and, at this time, execute pressure control to control the pressure of the molding material by the opening degree of said injection control valve and finish output of a control command for said feedback control of speed and start output of a control command for said pressure control after output of a control command for opening said booster valve in transition from injection to boosting.

2. An injection apparatus as set forth in claim 1, wherein said control device starts output of the control command for opening said booster valve when the position of said plunger reaches a predetermined boosting start position and after that starts output of the control command for the pressure control when a physical quantity which can fluctuate among a plurality of cycles in accordance with variation of the amount of supply of the molding material among a plurality of cycles even if the position of said plunger is the same position among a plurality of cycles reaches a predetermined switching judgment value.

3. An injection apparatus as set forth in claim 2, wherein said control device starts output of the control command for the pressure control when the speed of said plunger as said physical quantity falls to said switching judgment value.

4. An injection apparatus as set forth in claim 2, further comprising a display device, wherein said control device makes the display device display a predetermined alarm display in a case where the position of said plunger at the time when the plunger stops due to completion of filling the molding material into the mold exceeds a predetermined threshold value.

5. A molding apparatus comprising an injection apparatus according to claim 1.

6. A molding method
using an injection apparatus having
an injection cylinder which has
an injection piston connected to a plunger injecting a molding material into a mold and
a booster piston capable of pressurizing the pressure in the back of said injection piston,
a hydraulic pressure device which has
an injection control valve capable of controlling a discharge of the hydraulic fluid from the front of the injection piston and
a booster valve for controlling the supply of the hydraulic fluid to the back of said booster piston, and
a position sensor with detects the position of the plunger,
the molding method comprising
a hydraulic fluid supplying step of supplying hydraulic fluid to said back of the injection piston,
a speed control command step of commanding said hydraulic pressure device to perform feedback control of speed based on a detected value of the position sensor for controlling the speed of said plunger by an opening degree of said injection control valve at the time of injection,
a booster valve opening command step of commanding said hydraulic pressure device to open said booster valve, and
a pressure control command step of commanding said hydraulic pressure device to perform pressure control for controlling the pressure of the molding material by the opening degree of said injection control valve at the time of boosting,
wherein said speed control command step is finished and said pressure control command step is started after the start of said booster valve opening command step.

* * * * *